United States Patent [19]

Vuillet et al.

[11] Patent Number: 4,880,355
[45] Date of Patent: Nov. 14, 1989

[54] BLADE WITH CURVED END FOR A ROTARY AIRFOIL OF AN AIRCRAFT

[75] Inventors: Alain E. Vuillet, Bouc Belair; Jean J. Philippe, Versailles; Andrë Desopper, Garches, all of France

[73] Assignees: Aerospatiale Societe Nationale Industrielle, Paris; Office National D'Etudes et de Recherches Aerospatiales, Chatillon, both of France

[21] Appl. No.: 211,420

[22] Filed: Jun. 24, 1988

[30] Foreign Application Priority Data

Jun. 29, 1987 [FR] France ................... 87 09150

[51] Int. Cl.$^4$ ........................................... B64C 27/46
[52] U.S. Cl. ........................................ 416/228; 416/237
[58] Field of Search .......... 416/228 A, 228 R, 237 A, 416/237 R; 244/35 R

[56] References Cited

U.S. PATENT DOCUMENTS

| | | | |
|---|---|---|---|
| 1,692,081 | 11/1928 | La Cierva | 416/237 A X |
| 1,967,795 | 7/1934 | Wallis | 244/35 R |
| 3,411,738 | 11/1968 | Sargent | 244/40 |
| 3,721,507 | 3/1973 | Monteleone | 416/228 A |
| 4,334,828 | 6/1982 | Moffitt | 416/228 |
| 4,451,206 | 5/1984 | Philippe et al. | 416/228 |

FOREIGN PATENT DOCUMENTS 2067493 7/1981 United Kingdom .

*Primary Examiner*—Everette A. Powell, Jr.
*Attorney, Agent, or Firm*—Fisher, Christen & Sabol

[57] ABSTRACT

The invention provides a rotary aircraft airfoil comprising an attachment for fixing to a hub, a current part having a leading edge and a trailing edge and whose profile has a chord of constant or evolutive length, and a tip which extends said current part outwardly and whose leading edge extends the leading edge of said current part rearwardly in a sweep, said tip being in addition downwardly slanted. This blade is remarkable in that the downward slant of said blade tip extends over the whole of the span of this tip and is continuous from the connection with the current blade part as far as the end edge of said tip so that said tip follows a curvature such that its extrados is convex and its intrados is concave.

10 Claims, 8 Drawing Sheets

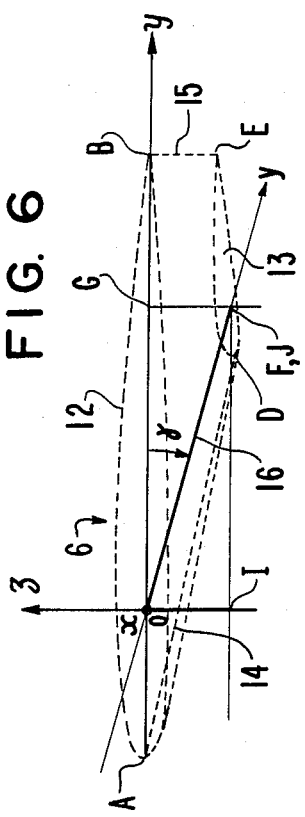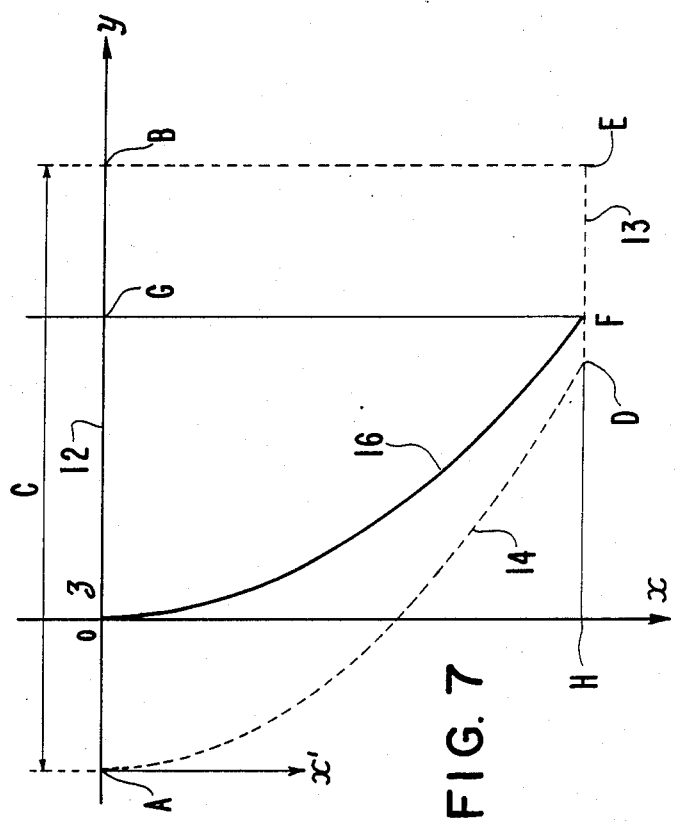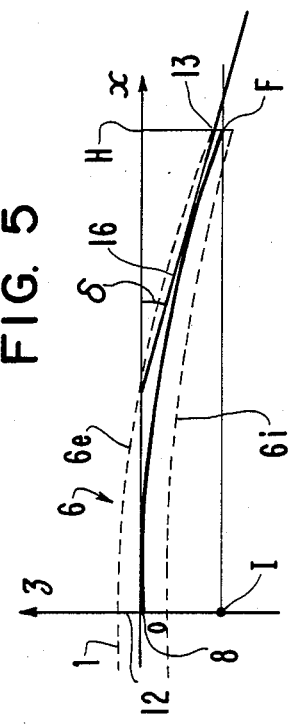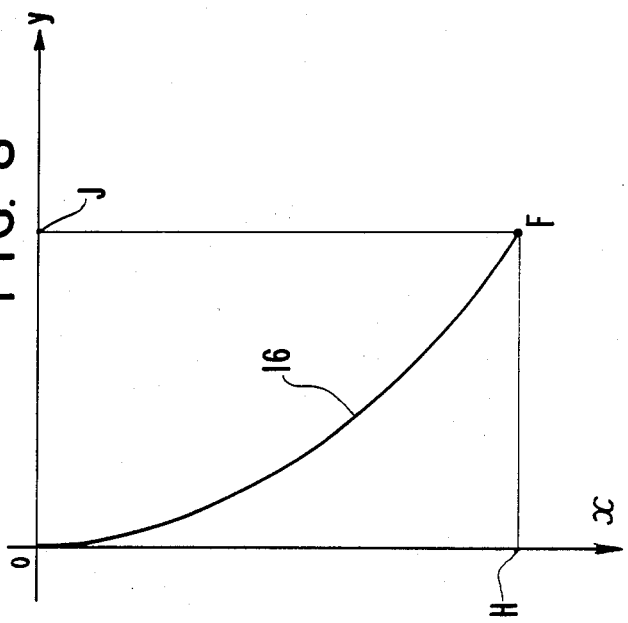

BLADE WITH CURVED END FOR A ROTARY AIRFOIL OF AN AIRCRAFT

BACKGROUND OF THE INVENTION

1. Field of the Invention

The present invention relates to a rotary airfoil blade for aircraft and more particularly the tip of such a blade.

2. Description of the Prior Art

It is known that, not only in hover flight but also in advancing flight, the tips of the blades of the rotor of an aircraft with rotating airfoil, particularly a helicopter, has an important influence on the aerodynamic functioning of the rotor. In fact, the blade tips form the zones in which the greatest dynamic pressures and marginal vortices appear, which generate noise and power losses.

Improvement of the blade tips may result in an appreciable improvement in the performances of the aircraft. This is why numerous studies have been carried out in this connection.

For example, in the French patent No. FR-A-2 473 983, a helicopter blade is described whose tip is tapered and swept rearwardly and, in addition, is downwardly slanted. With the total span of the blade equal to R, this tip extends over a span of 0.07 R and is bent about a chord of the blade disposed at 0.04 R from the endmost edge of the blade. The whole of the outermost portion of the blade forms, with respect to the rest of said blade, a downwardly directed dihedral angle whose value is chosen equal to 20°.

Thus, the blade described in said patent comprises a clear break at a distance from the axis of rotation equal to 0.96 R.

With such a downward break, of the blade tip, the author of this patent claims an improvement in the hover performances of the blade. In fact, he explains that the blade tip dihedral makes it possible to emit the end vortex lower than when the blade tip is aligned with the rest of the blade. Consequently, when the following blade of the airfoil passes through the position of the vortex generated by the preceding blade, this vortex is further away from the following blade, so that the interaction between this latter and the preceding blade vortex is reduced.; hover test results published subsequently by the author of this patent confirm power gains, for the same weight and in hover flight, of the order of 2 to 4%, due to the blade tip dihedral alone.

The purpose of the present invention is to improve a blade for a rotary airfoil with downwardly slanted tip not only in order to further improve the hover performances but also, and especially, to obtain better performances in advancing flight. It will be notd that in said patent, only the evolution of the chord of the profiles and the sweep of the tip are presented as having a beneficial effect on the power in advancing flight.

SUMMARY OF THE INVENTION

To this end, in accordance with the invention, the blade for the rotating airfoil of an aircraft having an attachment for fixing to a hub, a current part having a leading edge and a trailing edge and whose profile has a chord of constant or evolutive length C, and a tip which extends said current part outwardly and whose leading edge extends the leading edge of said current part rearwardly in a sweep, said tip being in addition downwardly slanted, is remarkable in that the downward slant of said blade tip extends over the whole of the span of this tip and is continuous from the connection with the current blade part as far as the endmost edge of said end, so that this latter follows a curvature such that its extrados is convex and its intrados is concave.

Thus, in the blade of the invention, the end is not bent about a chord over a part of its span but, on the contrary, is curved progressively downwards over the whole of its span. Tests in a wind chamber have shown that this continuous curvature is favorable not only in hover flight but also in advancing flight. In hover flight, with respect to a blade having a rectilinear and rectangular end, the blade of the invention makes possible, for an equal weight of the aircraft, a power gain of at least 5%.

Similarly, in cruising flight and at high speed, with respect to this same rectilinear and rectangular blade end, the blade of the invention provides, for equal weight and speed, a power gain of at least 5%.

To explain these performance gains, not only in hover flight but also in advancing flight, the applicants assume that an end vortex generated by a blade rotates mainly about an axis substantially orthogonal to the axis of rotation of the rotary airfoil, so that the speeds induced by such a vortex become substantially tangent to the curved end of the blades of the invention and that a vortex no longer has an induced speed component which is orthogonal to the blades and capable of modifying the incidence thereof. Of course, the present explanation is given only by way of hypothesis, whose correctness could not condition the validity of the present invention.

Preferably, the downward curvature of said blade end has at least an approximately parabolic trend.

More precisely, if, as is usual, we consider in the blade a longitudinal reference line which extends the pitch controlled variation axis along the span of the current part of the blade, which reference line is generally situated between 20 and 30% of the length of the chord of the corresponding profile from the front and about which a helicopter blade is generally twisted, the continuous bend of the blade tip of the invention is advantageously obtained by giving a parabolic trend to the extension of this reference line in said blade tip.

More precisely, if we consider a system of orthogonal axes Ox, Oy and Oz whose origin is situated on this pitch variation reference line at the connection of said current part and said blade tip, with the axis Ox aligned with this reference line of the current part and being oriented outwardly of the blade, whereas the axis Oy merges with the chord of the profile of the connection between said current part and said tip and is oriented from the leading edge to the trailing edge and the axis Oz is oriented upwardly, i.e. from the intrados to the extrados of the blade, it is advantageous for the reference line of said blade tip to be contained in a plane xOY passing through the axis Ox and whose plot OY in the plan yOz forms an angle $\gamma$ with the axis Oy and for the equation of said reference line of said blade tip in the plane xOY to be a parabolic trend function in which the coefficient of the highest degree term depends on said angle $\gamma$.

Thus, not only is a downwardly parabolic trend curvature communicated to said blade tip, but in addition the leading edge of this tip is given a swept form at least substantially parabolic (except for the distortions due to possible twisting). Such a parabolic form of the leading edge results in giving a local sweep angle which increases progressively, but considerably, with the blade span. This progressive sweep reduces the blade drag. In addition, it results from the parabolic shape of the leading edge of said blade tip that the chord of this blade tip decreases progressively with the span, so that the wet surface of the blade tip decreases significantly, which also contributes to decreasing local drag forces. The result is furthermore a reduction of the marginal vortices and so a reduction of the interactions of these latter with the following blade of the airfoil.

It can be seen that by adjusting the value of the angle $\gamma$, the performances of the blade of the invention can be optimized.

Preferably, in the plane xoY, the equation of said reference line of the blade tip is of the form:

$$\frac{Y}{C} = \left(1 - \frac{d}{c}\right)(1 - \alpha)f(\gamma)\frac{x^n}{a}.$$

in which expression:

C is the length of the chord of the connection profile between the current part of the blade and tip portion of said blade, d is the length of the chord chosen for the endmost profile of the tip portion of the blade, $\alpha$ is a coefficient defining the position along the blade chord of the reference line with $0.2 \leq \alpha 0.3$; this coefficient being usually chosen equal to 0.25;

f ($\gamma$) is a trigonometric function of the angle $\gamma$, for example equal to 1/cos$\gamma$ a is the span of said blade tip;

n is an exponent between 1.5 and 3 and preferably equal to 2 and in this case the reference line of said blade tip is a pure parabola.

Angle $\gamma$ may be between 0° and 90° and preferably between 15° and 30°. Furthermore, the span a of the blade tip is less than or equal to 1.5C, but greater than or equal to 0.5C. Preferably, this span a is at least substantially equal to 0.8C.

To benefit from the above advantages relative to the parabolic sweeping of the leading edge of said blade tip it is advantageous for the chord d of the endmost profile of said blade tip to be between 0.2C and 0.6C.

In the case where the trailing edge of said blade tip is aligned with the trailing edge of the current part of the blade, the chord of said end profile of the blade tip is advantageously chosen equal to C/3.
on the other hand, when this trailing edge is swept back with respect to the trailing edge of the current part of the blade, the chord of said end profile is chosen at most equal to $$\frac{C}{2}.$$

As was mentioned above, the blade of the invention may be twisted in a way known per se along its span. The theoretical twist from the fixing attachment to the hub as far as and including said tip may be between $-8°$ and $-16°$ and be chosen preferably equal to $-12°$. Said tip is preferably twisted identically to the current part of the blade.

Furthermore, the profiles of the blade of the invention may have a relative thickness between 6% and 13% and, preferably, between 6% and 9% for said blade tip.

BRIEF DESCRIPTION OF THE DRAWINGS

The figures of the accompanying drawings will better show how the invention may be realized. In these figures, identical references designate identical elements.

FIGS. 5 to 7 illustrate respectively in projection in three orthogonal planes the reference line of said blade tip.

FIG. 8 shows this reference line in its plane.

DESCRIPTION OF THE PREFERRED EMBODMENTS

Figure 1:
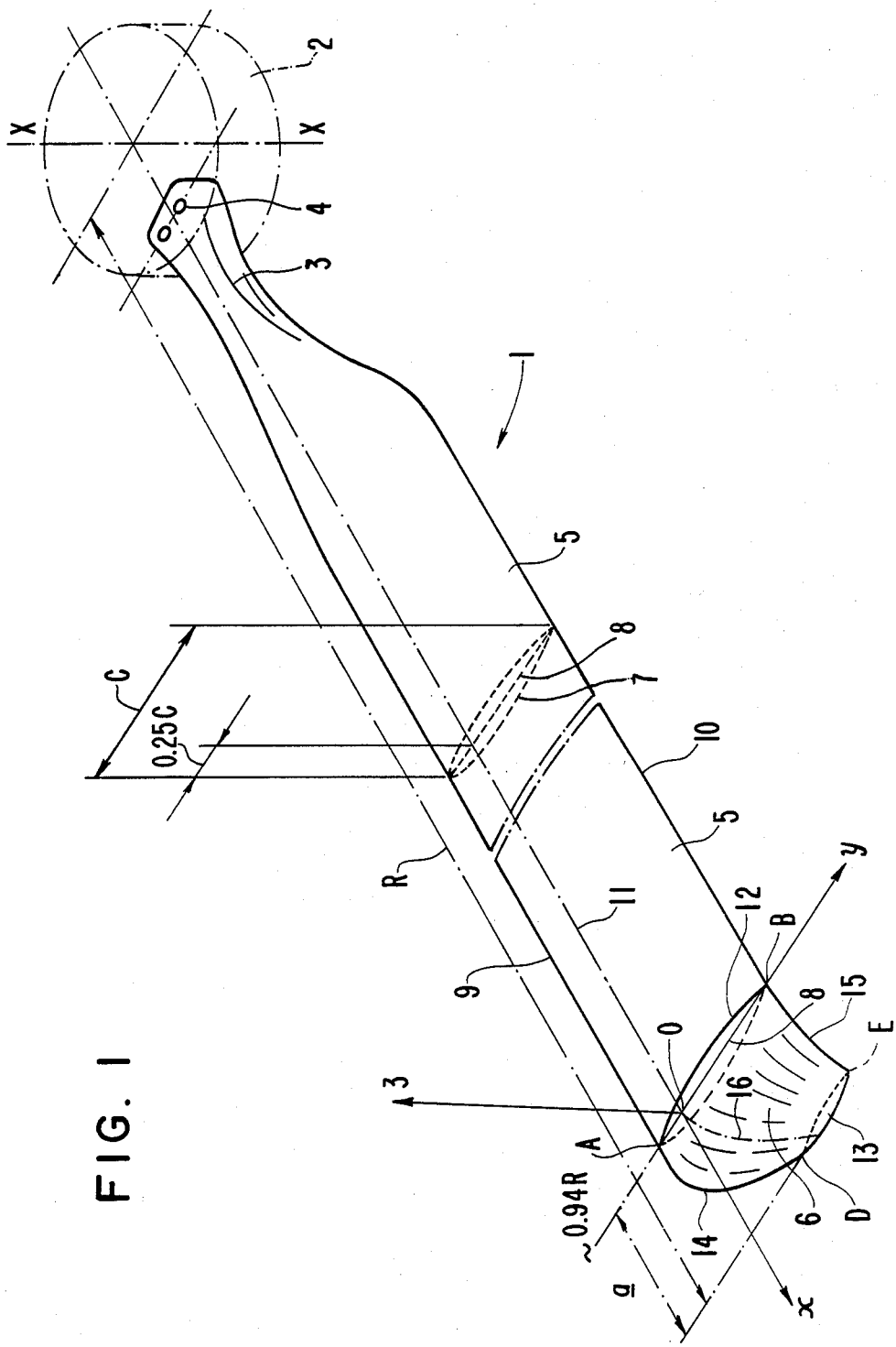
FIG. 1 is a schematical perspective view of a helicopter rotor blade having a blade tip in accordance with the present invention in the particular case where the coefficient $\alpha$ of the chord position of the axis of controlled pitch variation is equal to 0.25.

Blade 1, in accordance with the invention and shown in FIG. 1, forms part of a rotor whose hub 2 is illustrated purely schematically and whose other blades are not shown. This rotor may rotate about an axis X—X. It comprises blade hinge and retention members and in particular a pitch change hinge for each blade about an axis called controlled pitch variation.

Blade 1 comprises an attachment 3 with means 4 for fixing it to said hub, a current part 5 extending said blade root 3 outwardly and a tip portion 6 in accordance with the invention formed at the end of the current part 5 opposite attachment 3. The current part of blade 1, which represents the greatest length thereof, has a cross section substantially identical all along said current part and corresponding to a profile 7 whose chord 8 has a constant length C but could also have an evolutive chord of variable length, the length of the chord of the connection section having a value c and/or profiles which are evolutive in shape and/or relative thickness.

Along the current part of blade 1 is defined a reference line merging with the axis of the controlled pitch variation of the blade in hub 2.

In the example shown in FIG. 1, this reference line is situated at 25% of the chosen constant length c of chord 8 from the leading edge.

In addition, and as is usual, the current part of blade 1 may be twisted longitudinally, for example, about the reference line 11.

Blade 1 has a total span equal to R and, for example, the blade tip 6 begins at a distance which, measured from the axis X—X, is of the order of 0.94 R. The span a of this blade tip 6 then being of the order of 0.06 R.

Blade tip 6 is connected to the outboard end of the current part along a cross section 12, identical to the cross section of the end profile of the current part 5 and corresponding therefore to a profile 7 whose chord 8 has length C. At its end opposite the current part 5, the blade tip 6 is defined by an end profile 13 smaller and lower than the profile of the cross section 12. In fact, in this blade tip 6, the leading edge 14 is curved and, extending rearwardly, approaches the trailing edge 15 and a curvature is provided on the intrados side of said blade.

Figure 2:
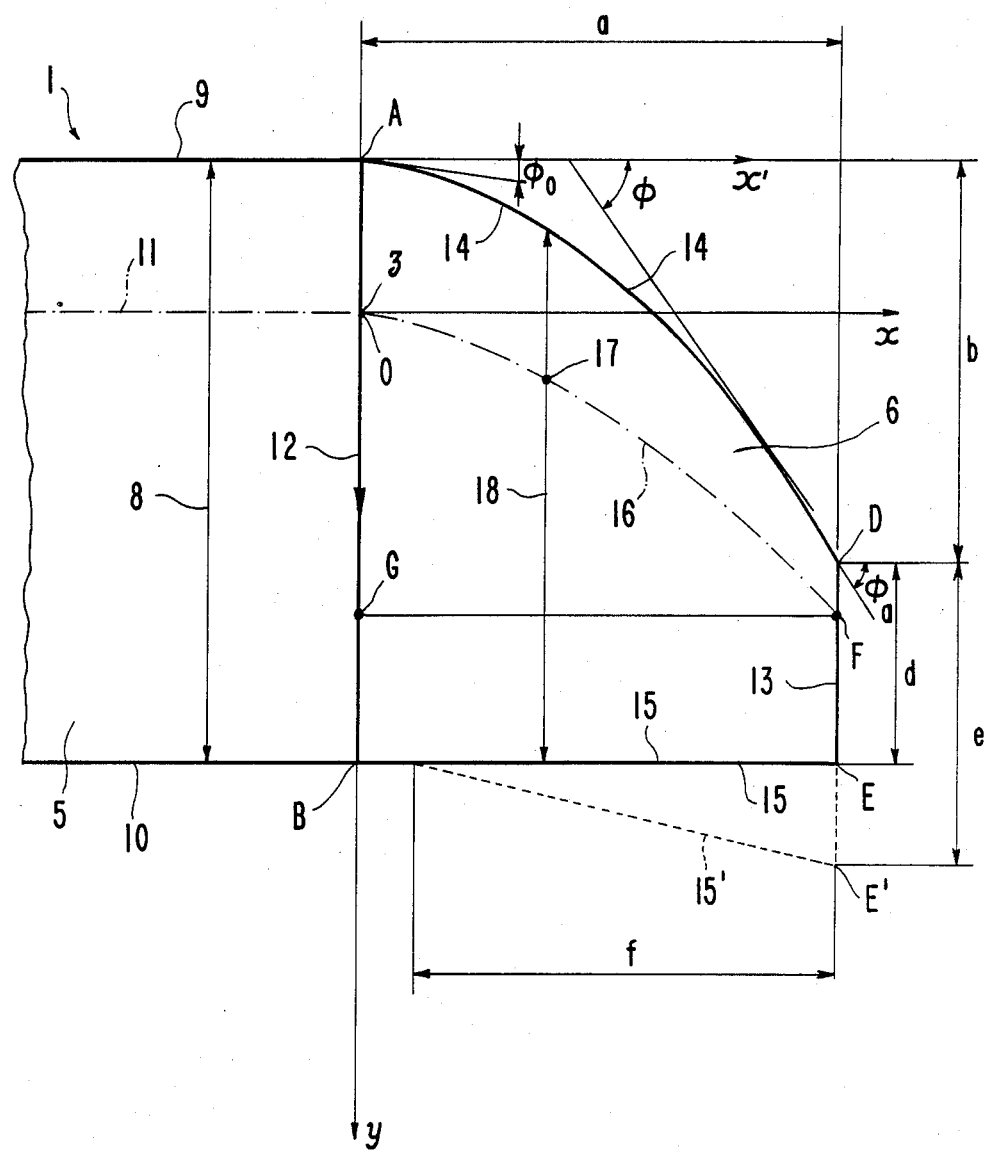
FIG. 2 is a schematical top view of the blade tip of the invention.

In FIG. 2, the form of blade tip 6 has been shown, when this latter is projected on the plane containing, before twisting of the blade, the leading edge 9, the trailing edge 10 and the reference line 11. The leading edge and trailing edge portions of profile 12, which are situated respectively at the junction of the leading edges 9 and 14 and at the junction of the trailing edges 10 and 15, are designated respectively by A and B. The leading edge and trailing edge points of the end profile 13 are respectively designated by D and E. Furthermore, the meeting point between line 11 and chord 8 of profile 12 has been designated by 0 and, by reference 16 is designated the curved line which represents the geometric locus of points 17 situated, on the chords of profiles 18 of tip 6, at a distance of 25% from the leading edge 14 (this distance being referenced to the length of said chords). The curved line 16 extends line 11 and intersects the chord of the end profile 13 at F. Point F is projected at G on chord 8 of profile 12, in projection parallel to lines 9, 10 and 11.

The span a of tip 6 is chosen so that:

$$0.5C \leq a \leq 1.5C, \text{ with preferably } a = 0.8C$$

Furthermore, the backing off b of point D with respect to point A, transversely to blade 1, is advantageously defined by:

$$0.4C \leq b \leq 0.8C$$

Consequently, if as is shown by continuous lines in FIG. 2, the trailing edge 15 of blade tip 6 is aligned with the trailing edge 10 of the current part 5, the length d of the chord of profile 13 is defined by $$0.2C \leq d \leq 0.6C$$

Preferably d is chosen $=C/3$

However, as is shown by broken lines 15' in FIG. 2, the trailing edge 15 may be swept back with respect to the trailing edge 10, so that point E is then situated at E'. In this case, the length e of the chord of profile 13 is advantageously equal to $$\frac{C}{2}$$

but the length f of the trailing edge 15' is then less than the span a of the blade tip 6.

In FIGS. 1 and 2, a system of orthogonal axes has been shown which has point O as origin and in which: the axis Ox extends the reference line 11 outwardly in alignment, axis Oy merges with chord 8 of profile 12 and is oriented from the leading edges 9, 14 to the trailing edges 10, 15, axis Oz is directed upwardly.

In addition, in FIG. 2, an axis Ax' has been shown parallel to axis Ox and also oriented outwardly.

In the system of axes Ax', Ay, the leading edge line 14 of the tip 6 has, for example, as equation that of the parabola in the particular case where $n=2$ and $\alpha=0.25$, $a = 0.8c$, $$b = 2\frac{c}{3} \text{ and } d = \frac{c}{3}$$

$$\frac{y}{C} = \frac{2}{3}\left(\frac{x'}{0.8C}\right)^2$$

The result then is: that chord c of the profiles 18 of tip 6 follow the parabolic law:

$$\frac{c}{C} = 1 - \frac{2}{3}\left(\frac{x'}{0.8C}\right)^2$$

and that the sweep angle $\phi$ of the leading edge 14 is given by:

$$\phi = \arctan \frac{5}{3}\left(\frac{x'}{0.8C}\right)$$

Figure 3:
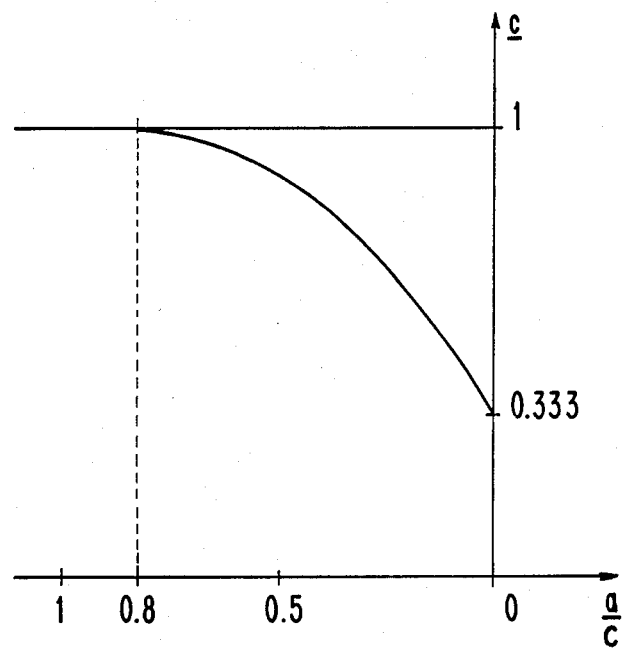
FIG. 3 illustrates the variation of the chords of the tip of the invention as a function of the span.
Figure 4:
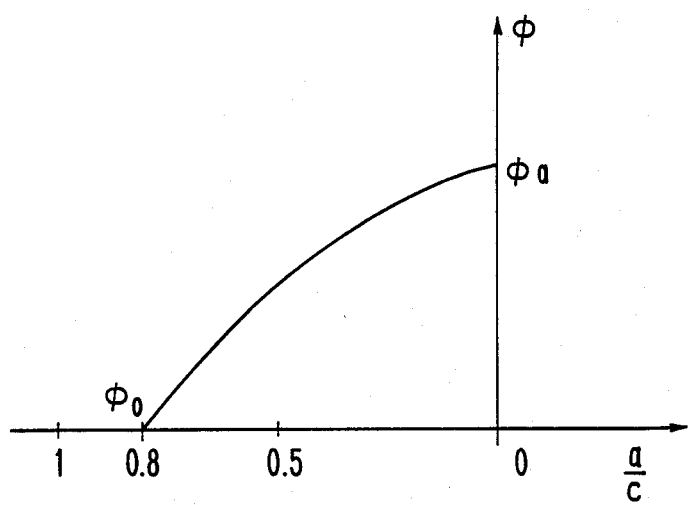
FIG. 4 illustrates the variation of the sweep angle of the leading edge of the tip of the invention as a function of the span.

In FIGS. 3 and 4, there have been respectively shown, as a function of the span a of tip 6 (referenced to the chord c of profile 7) the evolution of a chord c of profiles 18 (in the case where the trailing edge 15 is aligned with the trailing edge 15) and the evolution of the sweep angle of the leading edge 14. This latter angle varies from a zero value o at point A to a value a, for example of the order of 60°, at point D.

In FIGS. 5 to 7, line 16 has been shown respectively in planes xOz, yOz, xOy. As can be seen, this line 16 is contained in a plane xOy forming an angle with the axis Oy (see also FIG. 8).

In FIGS. 5 to 8, the different points A, B, D, E, F and G of FIG. 2 have been shown or their projections in the system of axes Ox, y, z; as well as the projection, parallel to the axis Ox, of point F on axis Oy, defined as the plot of plane xOy in the plane yOz.

As can be seen in FIG. 5, the extrados 6e and the intrados 6i of tip 6 are curved and respectively convex and concave.

If the leading edge line 14 has the equation given by way of example above, line 16 has as equation:

$$\frac{z}{C} = \frac{-\tan\gamma}{2}\left(\frac{x}{0.8C}\right)^2 \text{ in the plane } xOz \text{ (see FIG. 5)} \quad (1)$$

$$\frac{y}{C} = \frac{1}{2}\left(\frac{x}{0.8C}\right)^2 \text{ in the plane } xOy \text{ (see FIG. 7) and} \quad (2)$$

$$\frac{Y}{C} = \frac{1}{2\cos\gamma}\left(\frac{x}{0.8C}\right)^2 \text{ in the plane } xOY \text{ (see FIG. 8)} \quad (3)$$

Figure 9:
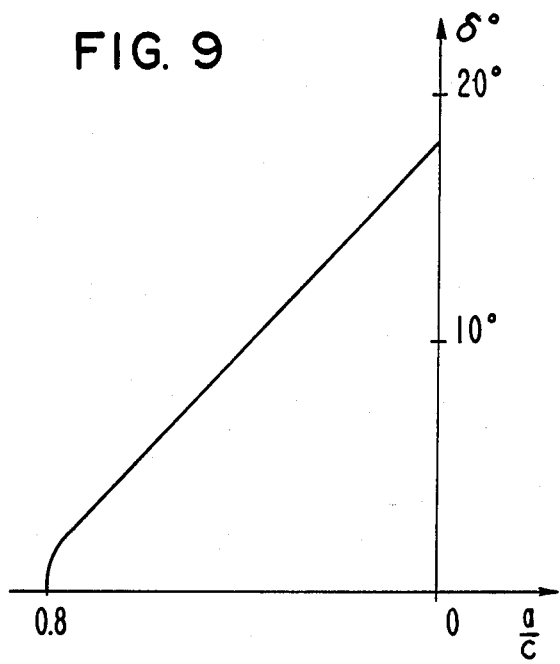
FIG. 9 shows the evolution of the angle of curvature of the tip of the invention as a function of the span.

If we plot the evolution of the angle of curvature of line 16 in plane xOz as a function of span a (referenced to C), a curve is obtained whose trend is illustrated in FIG. 9.

To judge the performances of blade 1 of the invention described above, comparative tests were carried out with a blade P1 identcal in all points to blade 1 except in so far as the curved tip 6 is concerned, which is replaced by a rectangular tip of a section identical to that of the current part 5 and with a blade P2, also identical in all respects to blade 1 except in so far as the curved tip 6 is concerned, which was replaced by a tip with identical shape in a plan view, but not downwardly curved. Thus, the tests comparing blades 1 and P1 make is possible to determine the combined influence of the curvature of tip 6 and the parabolic leading edge 14, whereas the tests comparing blades 1 and P2 make it possible to determine the influence of the curvature alone of tip 6.

Figure 10:
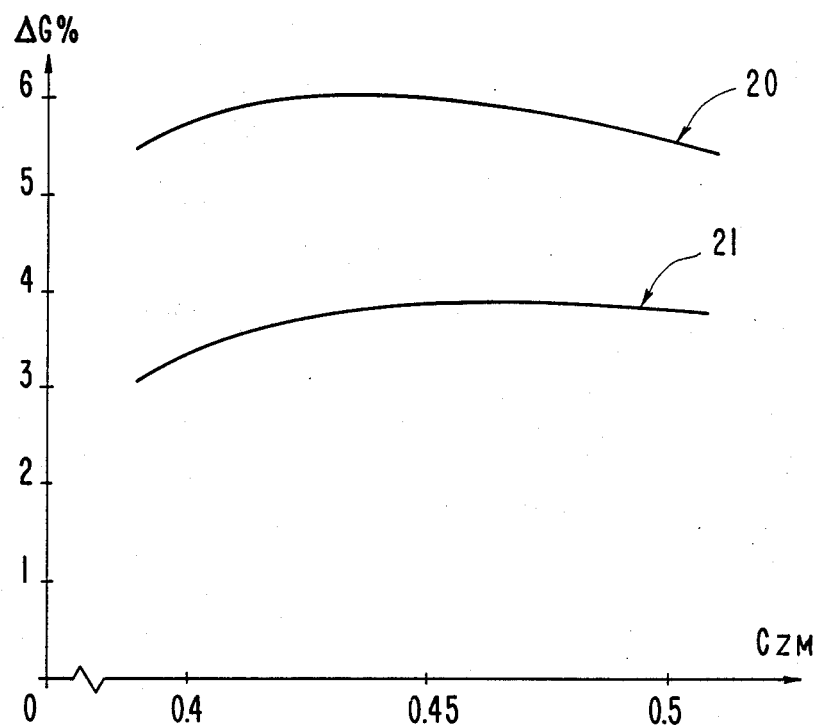
FIGS. 10 and 14 give the results of comparative tests of the blade of the invention with two other blades.

FIG. 10 shows the results of tests in a wind tunnel giving power gains $\Delta G$ (in %) as a function of the reduced lift Czm, calculated as being equal to the expression $$\frac{3T}{\frac{1}{2} \rho b C R U^2},$$

in which:
T is the thrust of the rotor to which the blade belongs,
$\alpha$ is the mass per unit of volume of the air,
b is the number of blades of the rotor,
C is the chord of the blade,
R is the radius of the blade, and
U the peripheral speed of the blade.

This reduced blade lift corresponds to the mean load per blade and is sometimes expressed in the American form 6 CT/6.

In this FIG. 10, curve 20 corresponds to the comparison of blades 1 and P1 and curve 21 corresponds to the comparison of blades 1 and P2. It can thus be seen that, in hover flight, the curvature of tip 6 alone produces a power gain of 3 to 4% (curve 21) whereas the combination of the curvature of tip 6 and of the parabolic leading edge 14 gives a gain of 5 to 6% (curve 20).

Figure 11:
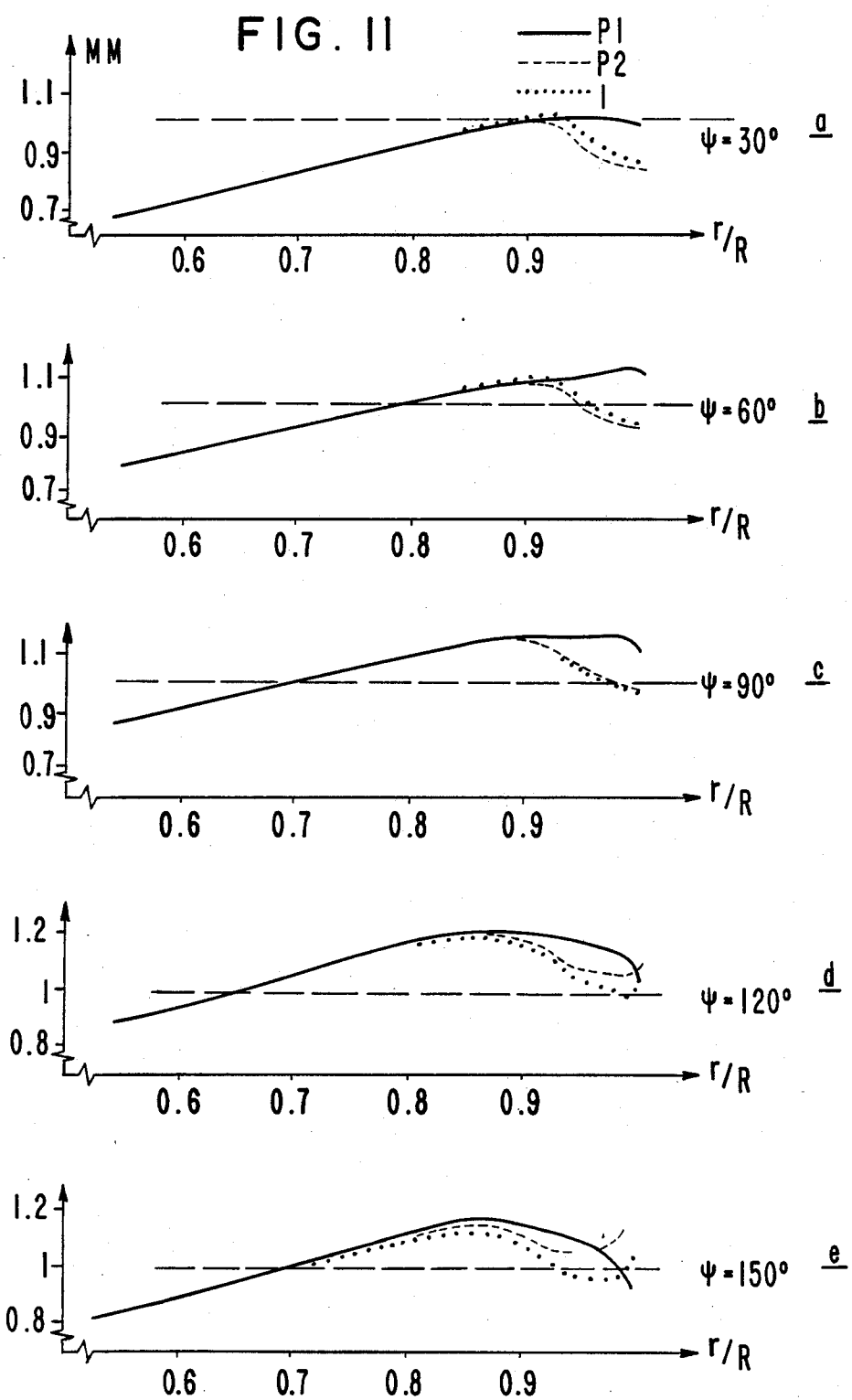
FIGS. 11 to 13 give results of comparative calculations of the blade of the invention with two other blades.
Figure 12:
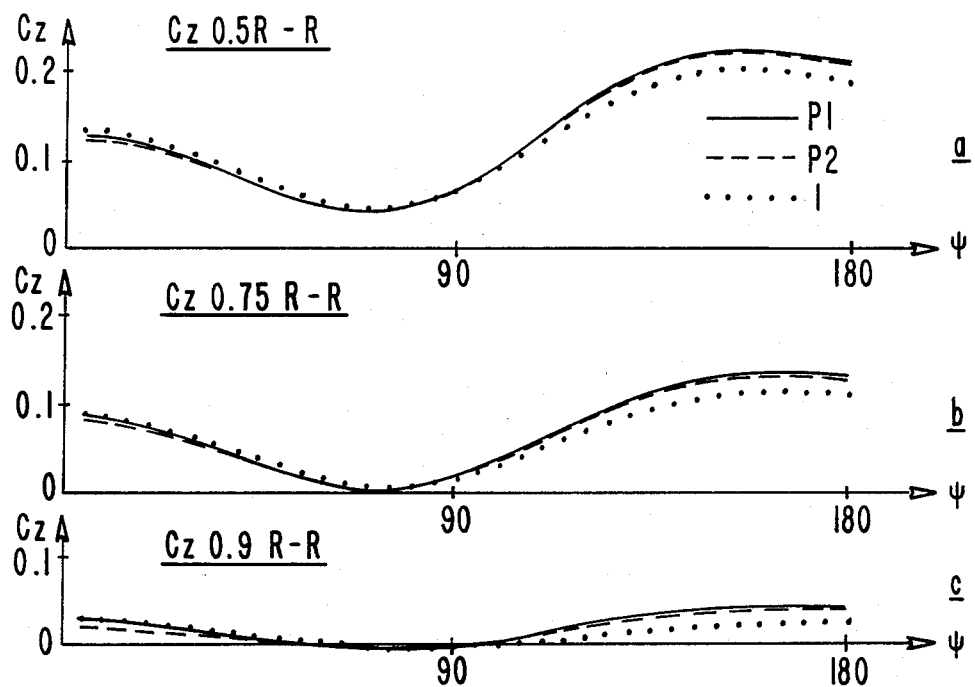

Diagrams a to e in FIG. 11 and diagrams a to c of FIG. 12 illustrate the advantages of blade 1 of the invention with respect to blades P1 and P2 defined above, in a rapid advancing flight configurtion (advancing parameter equal to 0.355 associated with a peripheral Mach number of rotor drive equal to 0.64) for a reduced lift coefficient Czm=0.463 (CT=0.078).

The diagrams of FIG. 11 give the locl maximum Mach numbers MM calculated on the extrados as a function of the distance r to the axis X—X of the rotor (referred to the total span R) for different azimuths $\Psi$. These diagrams show the influence of blade 2 (form in plan view of blade 1) for reducing over substantially the whole sector of the advancing blade, and significantly, the local maximum Mach numbers at the blade tip. They also show the advantage of blade 1, in particular after azimuth 120°, for maintaining low overspeeds at the extrados of the tip, whereas blade P2 then performs not much better than blade P1.

The diagrams of FIG. 12 shows the evolution of the lift coefficient Cz calculated as a function of the azimuth respectively in the zone of the blades between the span value 0.5R and R (diagram a), 0.75R and R (diagram b) and 0.9R and R. These diagrams show that the curvature in accordance with the invention in fact makes it possible to unload the blade tip 6 after azimuth 90°, in a sector where the operating conditions are generally the most severe. The slight increase in lift which these tips undergo before azimuth 90° is practically not penalizing, since it is an azimuth sector where the unsatisfactory effects due to an increasing incident Mach. number are particularly favorable for delaying the appearance of shock waves.

Figure 13:
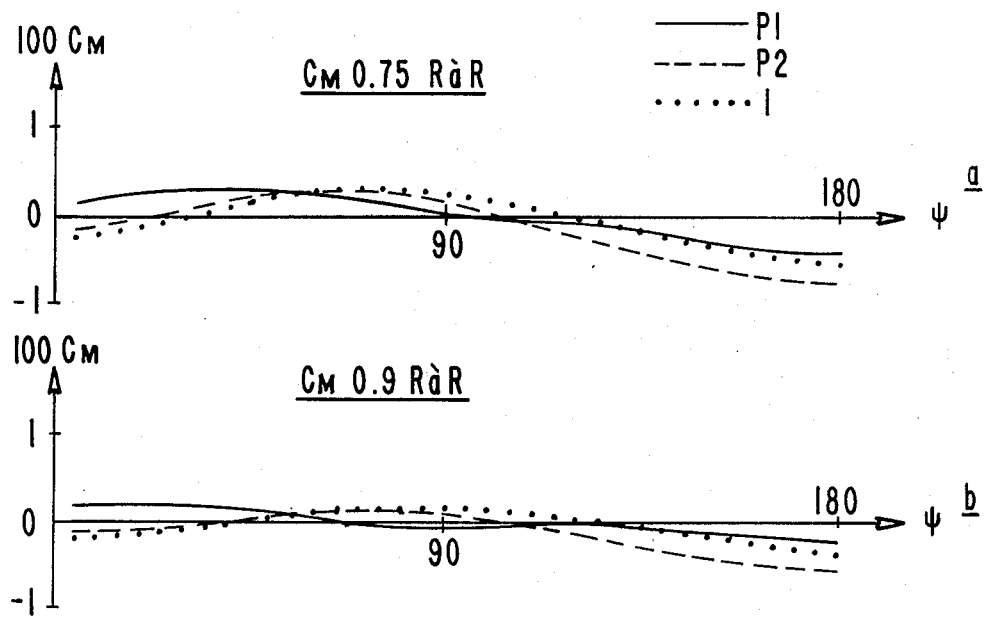

Diagrams a and b of FIG. 13 illustrate the calculated twisting moments $C_M$ as a function of azimuth $\Psi$ respectively in the zone 0.75R - R and 0.9R - R. These diagrams show that the continuous curvature of tip 6 of the invention makes it possible to remain at a twisting moment level very comparable to what it is on a rectangular blade P1, i.e. at a blade control force level appreciably less than what it would have been by simply sweeping the blade tip back. The possibility will also be noted of the curved tip of the invention having nose-up moments (CM0) about azimuth 90°, which, by an untwisting effect of the blade, reduces the negative lift zones at the blade tip.

Figure 14:
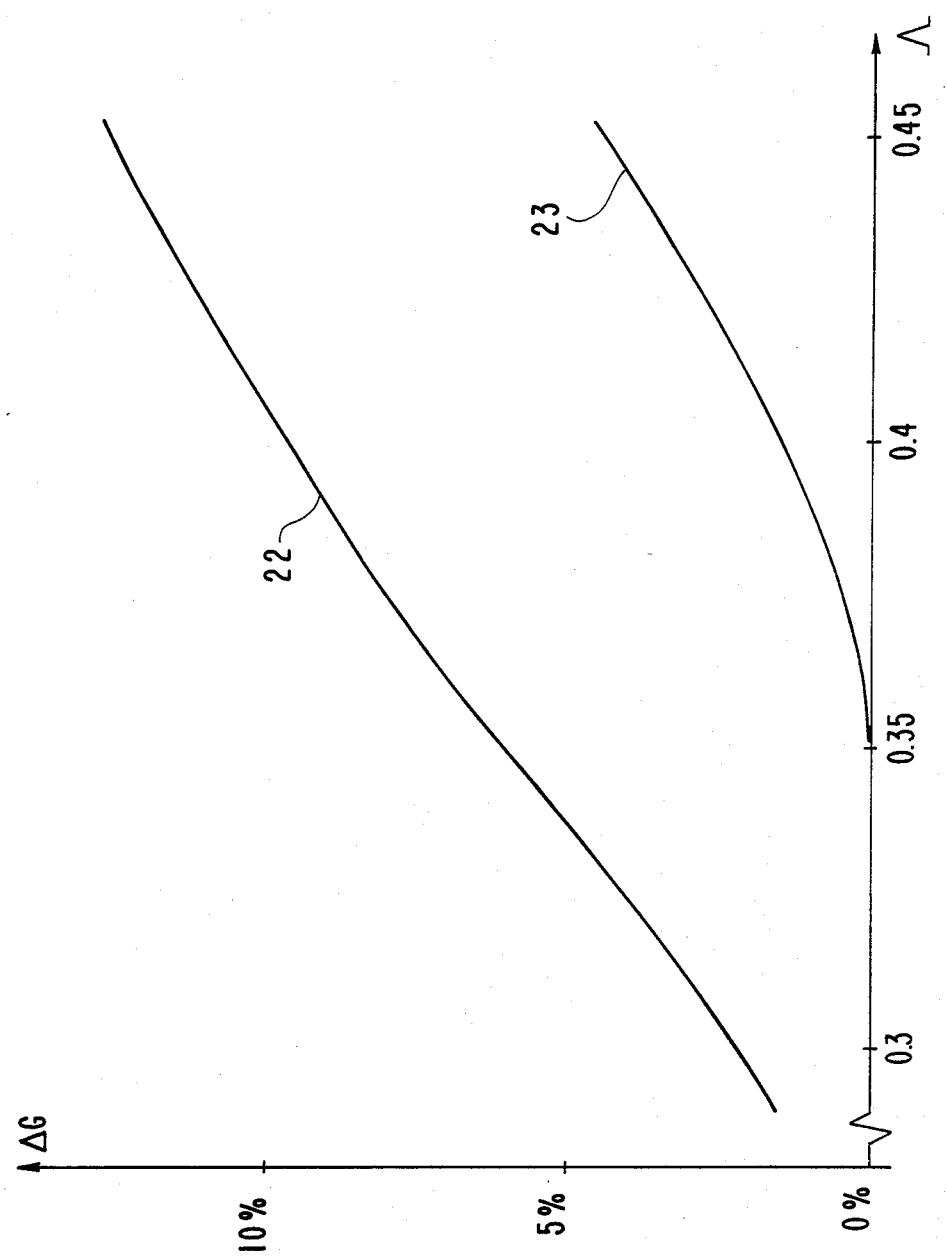

In FIG. 14, curves 22 and 23 have been shown representing the power gain $\Delta G$ (in %) as a function of the advancing parameter $\Lambda$, defined as the ratio of the advancing speed of the aircraft over the peripheral speed of the rotor. Curve 22 gives the result of the comparison between blades 1 and P1 and curve 23 that of the comparison between blades 1 and P2. These curves illustrate power gains of blade 1 increasing rapidly with said advancing parameter $\Lambda$.

What is claimed is

1. Blade for the rotating airfoil of an aircraft having an attachment for fixing to a hub, a current part having a leading edge and a trailing edge and whose profile has a chord of constant or evolutive length C, and a tip whose span is less than 10 percent of the total span of the blade, which extends from said current part outwardly and whose leading edge extends from the leading edge of said current part rearwardly in a sweep, said tip being in addition downwardly slanted, wherein said downward slant of said blade tip extends over the entire length of this tip and is continuous from the connection from the current blade part as far as the end edge of said tip so that said tip follows a curvature such that its extrados is convex and its intrados is concave, the downward curvature of said blade tip being at least approximately of parabolic trend, the extensionin said tip of a reference line of the current part merging with the controlled pitch variation axis of said blade, has a substantially parabolic trend, referred to a system of orthogonal axes Ox, Oy and Oz, whose origin O is situated at the connection of the reference line of said current blade part and of the reference line of said blade end, the axis Ox being aligned with the reference line of said current part and being oriented outwardly of the blade, whereas the axis Oy merges with the chord of the connection profile between said current part and said end and is oriented from the leading edge to the trailing edge and the axis Oz is oriented upwardly, namely from the intrados to the extrados of the blade, wherein said reference line of said blade tip is contained in a plane xOY passing through the axis Ox and whose plot OY in the plane yOz forms an angle $\gamma$ with the axis Oy and, in the plane xOY, the equation of said reference line of said blade tip is a parabolic trend function in which the coefficient of the highest degree term depends on the angle $\gamma$.

2. The blade as claimed in claim 1, wherein, in the plane xOY, the equation of said reference line of said blade end is of the form:

$$\frac{Y}{C} = \left(1 - \frac{d}{c}\right)(1 - \alpha)f(\gamma)\left(\frac{x}{a}\right)^n$$

in which expression:
C is the length of the chord of the profile of the end of the current blade part, d is the length of the chord chosen for the end profile of the blade tip, $\alpha$ is the blade chord position of the reference line in said blade tip, f ($\gamma$) is a trigonometric function of the angle $\gamma$, a is the span of said blade tip and, n is an exponent between 1.5 and 3.

3. The blade as claimed in claim 2, wherein the reference line of said blade tip is a pure parabola, the value of n being then chosen equal to 2.

4. The blade as claimed in claim 2, wherein the angle $\gamma$ is between 0° and 90°.

5. The blade as claimed in claim 4, wherein the angle $\gamma$ is between 15° and 30°.

6. The blade as claimed in claim 2, wherein the span a of the blade tip is less than or equal to 1.5C, but greater than or equal to 0.5C.

7. The blade as claimed in claim 6, wherein the span a of the blade tip is at least substantially equal to 0.8C.

8. The blade as claimed in claim 2, wherein the chord d of the end profile of said blade tip is between 0.2C and 0.6C.

9. The blade as claimed in claim 8, in which the trailing edge of said blade tip is aligned with the trailing edge of said current blade part, wherein the chord d of the end profile of the blade tip is equal to C/3.

10. The blade as claimed in claim 8, in which the trailing edge of said blade tip is swept back with respect to the trailing edge of the current blade part, wherein the chord of the end profile of the blade tip is at most equal to C/2.

* * * * *